US008209366B2

(12) United States Patent
Dobbek et al.

(10) Patent No.: US 8,209,366 B2
(45) Date of Patent: Jun. 26, 2012

(54) METHOD, APPARATUS AND PROGRAM STORAGE DEVICE THAT PROVIDES A SHIFT PROCESS WITH SATURATION FOR DIGITAL SIGNAL PROCESSOR OPERATIONS

(75) Inventors: Jeffrey J. Dobbek, Morgan Hill, CA (US); Kirk Hwang, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1013 days.

(21) Appl. No.: 11/068,206

(22) Filed: Feb. 28, 2005

(65) Prior Publication Data

US 2006/0195497 A1 Aug. 31, 2006

(51) Int. Cl.
G06F 7/00 (2006.01)
G06F 7/38 (2006.01)
(52) U.S. Cl. .................. 708/209; 708/552; 708/553
(58) Field of Classification Search .......... 708/209, 708/234, 498, 552, 553
See application file for complete search history.

(56) References Cited

U.S. PATENT DOCUMENTS

| | | | |
|---|---|---|---|
| 3,812,470 A | 5/1974 | Murtha et al. | |
| 4,843,543 A * | 6/1989 | Isobe | 711/148 |
| 5,241,490 A | 8/1993 | Poon | |
| 5,448,509 A * | 9/1995 | Lee et al. | 708/530 |
| 5,557,183 A * | 9/1996 | Bates et al. | 318/434 |
| 5,684,728 A * | 11/1997 | Okayama et al. | 708/525 |
| 5,706,217 A * | 1/1998 | Genrich | 708/200 |
| 5,745,393 A | 4/1998 | Wong | |
| 5,784,532 A | 7/1998 | McDonough et al. | |
| 5,844,827 A * | 12/1998 | Wong | 708/209 |
| 5,907,498 A * | 5/1999 | Rim | 708/553 |
| 5,915,109 A * | 6/1999 | Nakakimura et al. | 712/221 |
| 5,959,636 A * | 9/1999 | Lin et al. | 345/501 |
| 6,078,940 A * | 6/2000 | Scales | 708/552 |
| 6,314,443 B1 * | 11/2001 | Seal | 708/552 |
| 6,321,248 B1 | 11/2001 | Bonnet et al. | |
| 6,757,819 B1 * | 6/2004 | Hoyle et al. | 708/209 |
| 7,103,621 B2 * | 9/2006 | Rodriguez et al. | 708/204 |
| 7,206,800 B1 * | 4/2007 | Bentz | 708/553 |
| 7,543,014 B2 * | 6/2009 | Chauvel et al. | 708/552 |

(Continued)

FOREIGN PATENT DOCUMENTS

EP 1 058 185 A1 6/2000

OTHER PUBLICATIONS

Onoye, T. et al., "Low-power implementation of H.324 audiovisual codec dedicated to mobile computing" Design Automation Conference 1998. NY, NY, USA, IEEE, US, Feb. 10, 1998.

(Continued)

Primary Examiner — Chuong D Ngo
(74) Attorney, Agent, or Firm — Merchant & Gould (57) ABSTRACT

A method, apparatus and program storage device that provides a shift process with saturation for digital signal processor operations are disclosed. An instruction is generated for shifting an operand to either maximum or the minimum value depending on the bit of data input when saturation occurs. A saturation detection circuit is combined with an arithmetic shifter and a final decision multiplexor. The final decision multiplexor receives the output from the arithmetic shifter and the saturated value from the saturation circuit. When saturation is detected by the saturation detection circuit, the final decision multiplexor selects the saturate minimum or the saturate maximum depending on whether the MSB of the data in equals one or zero, respectively.

25 Claims, 4 Drawing Sheets

U.S. PATENT DOCUMENTS

2006/0031272 A1* 2/2006 Dhong et al. ............... 708/209

OTHER PUBLICATIONS

Printed from internet on Feb. 21, 2005, J. Liang et al., "Floating Point Unit Generation and Evaluation for PFGAs," http://www.ecs.umass.edu/ece/tessier/jliang-fccm03.pdf, 10 pages.

Aug. 1997, TMS320C54x DSP, CPU and Peripherals, Reference Set, vol. 1, Chapter 4, dualist.stanford.edu/~ee487/HOMEWORK/lab22_www.html, 63 pages.

M. Schmookler et al., "Leading Zero Anticipation and Detection—A Comparison of Methods," Proceedings of the 15$^{th}$ IEEE Symposium on Computer Arithmetic (ARITH'01), Vail, Colorado, Jun. 11-13, 2001, 6 pages.

* cited by examiner

Fig. 4

METHOD, APPARATUS AND PROGRAM STORAGE DEVICE THAT PROVIDES A SHIFT PROCESS WITH SATURATION FOR DIGITAL SIGNAL PROCESSOR OPERATIONS

BACKGROUND OF THE INVENTION

1. Field of the Invention

This invention relates in general to digital signal processing, and more particularly to a method, apparatus and program storage device that provides a shift process with saturation for digital signal processor operations.

2. Description of Related Art

Techniques are known in the domain of integrated circuits using calculation units for verifying if the format allowed for the result of an arithmetic operation carried out by an AU (Arithmetic Unit) on two operands and an input carry digit does not exceed a given format. This technique has applications in most calculation units, such as, calculation units included in programmable circuits, such as, a digital signal processor (DSP) or a microcontroller.

To process the applications, the central processing unit includes circuitry to receive and decode instructions and circuitry to process data in accordance with the decoded instructions. The circuitry to process the data typically includes an arithmetic logic unit (ALU). The arithmetic logic unit performs arithmetic functions such as add, subtract, multiply, divide, shift data, etc. and performs logic functions such as AND, OR, NAND, NOR, exclusive OR, etc. More specifically, the ALU consists of two kinds of operations: arithmetic operation such as addition/subtraction and logical operation.

Addition and subtraction are straightforward and unexceptional. When adding two i-bit numbers, the result may be an n+1-bit binary due to the carry-out. In computer hardware, data is typically represented as fixed-width number. Thus, the sum of 0110 and 1110 will be 0100 in a 4-bit processor and an overflow is used to point out the result is erroneous. Subtraction behaves similar. The same problem occurs in two's complement number system, under different condition. In the twos complement representation, negative numbers are represented as the result of a subtraction of the magnitude of the number from zero. That is, in a four-bit system, for example, a negative 2 is represented as the result of 0000 minus 0010, which is 1110 (the borrow, or carry, produced by the subtraction is ignored). The twos complement representation has the advantageous characteristic that additions and subtractions of twos complement numbers can be effected without regard for whether the numbers being added or subtracted are positive or negative. In the two's complement number system, the overflow occurs when adding two positive numbers and the sum is negative, or vice versa. Clearly, adding or subtracting two 32-bit numbers can yield a result that needs 33-bits to be fully expressed. The lack of a 33rd bit means that the overflow occurs and the sign bit is being set with the value of the result instead of the proper sign of the result.

Multiplication of signed numbers requires special care. For example, multiplying numbers with the same sign produces a positive product, but multiplying a positive number by a negative number yields a negative product. Multiplication may be performed using a sequence of shifts and additions. To achieve the data shift function, the arithmetic logic unit includes an arithmetic shifter. An arithmetic shifter is used to store a bit-vector of some specified length. It has two control signals: shift-left and shift-right. When shift-left is asserted, the bits in the vector are shifted one bit to the left, with a 0 shifted into the rightmost bit. When shift-right is asserted, the bits in the vector are shifted one bit to the right, with a copy of the most significant bit shifted into the leftmost bit.

An arithmetic shifter is typically implemented using a shift register. A shift register is a group of registers set up in a linear fashion that have their inputs and outputs connected together in such a way that the data is shifted down the line when the circuit is activated. Shifting a word right or left (which is equivalent to multiplying or dividing by a power of 2) is used in multiplication and division and also to align data on byte or word boundaries.

ALU results are saturated upon overflow. Arithmetic overflow is the condition that occurs when a calculation produces a result that is greater than a given register or storage location can store or represent. A digital processor may use a self-saturating number representation in which any arithmetic operation which generates an overflow will automatically set the output to a value having the proper sign and a magnitude equal to the maximum value which can be represented by the digital data word. For example, ALU saturation logic may be used to prevent a result from overflowing by keeping the result at a maximum (or minimum) value. Thus, when arithmetic operations produce values too large or too small for registers, the largest or smallest value that can be represented is substituted instead. More specifically:
 if ((result=a±b)>(2n-1))
   result=2n-1;
 else if ((a±b)<=-2n)
   result=-2n;
However, there is typically no solution for saturating the result of 2x*data. Furthermore, solutions that are used are very expensive in terms of cycles.

It can be seen then that there is a need for a method, apparatus and program storage device that provides a shift process with saturation for digital signal processor operations.

SUMMARY OF THE INVENTION

To overcome the limitations in the prior art described above, and to overcome other limitations that will become apparent upon reading and understanding the present specification, the present invention discloses a method, apparatus and program storage device that provides a shift process with saturation for digital signal processor operations.

The present invention solves the above-described problems by providing an instruction for shifting an operand to either maximum or the minimum value depending on the most significant bit of data input when saturation occurs. A saturation detection circuit is provided with an arithmetic shifter and a final decision multiplexor that receives the output from the arithmetic shifter and the saturated value from a saturation circuit. Herein, the term multiplexor is intended to include any type of device, e.g., switch, logic device, programming code, etc., that connects one signal selected from several inputs to a single output. When saturation is detected, the final decision multiplexor selects the saturate minimum or the saturate maximum depending on whether the MSB of the data in equals one or zero, respectively.

An arithmetic shifter with saturation detection in accordance with the principles of the present invention includes an arithmetic shifter for receiving input data and a shift amount indication, a saturation detector, coupled to the arithmetic shifter, for detecting when saturation occurs and generating a saturation signal in response, a saturation value generator for generating a saturation value and an output selector for selecting whether to provide as an output shifter the output data or the saturation value in response to the saturation signal.

In another embodiment of the present invention, a processor unit is disclosed. The processor unit includes memory for storing data and instructions therein and a processor for performing arithmetic shift operations, the processor being configured to receive input data and a shift amount indication, the processor further being configured for detecting when saturation occurs, generating a saturation value for output when saturation occurs and for providing as an output either the input data shifted by the shift amount or, in response to saturation being detected, the saturation value.

In another embodiment of the present invention, a storage control device is disclosed. The storage control device includes a storage controller for processing read and write signals and a processor unit, coupled to the storage controller, the processor unit performing operations in support of storage operations, wherein the processor unit is configured to receive a shift instruction from the storage controller, the shift instruction allowing input data to be shifted N bits in a single cycle, the processor further being configured for detecting when saturation results from the shift operation, generating a saturation value for output when saturation occurs and for providing as an output either the input data shifted by N bits or, in response to saturation being detected, the saturation value.

In another embodiment of the present invention, a data storage system is disclosed. The data storage system includes a translatable recording medium for storing data thereon, a motor for translating the recording medium, a transducer disposed proximate to the recording medium for reading and writing data on the recording medium, an actuator, coupled to the transducer, for moving the transducer relative to the recording medium and a storage control device for controlling operations of the data storage system, the storage control device further including a storage controller for processing read and write signals and a processor unit, coupled to the storage controller, the processor unit performing operations in support of storage operations, wherein the processor unit is configured to receive a shift instruction from the storage controller, the shift instruction allowing input data to be shifted N bits in a single cycle, the processor further being configured for detecting when saturation results from the shift operation, generating a saturation value for output when saturation occurs and for providing as an output either the input data shifted by N bits or, in response to saturation being detected, the saturation value.

In another embodiment of the present invention, an arithmetic shifter with saturation detection is disclosed. The arithmetic shifter with saturation detection includes means for receiving input data and a shift amount indication, means, coupled to the means for receiving input data and a shift amount indication, for detecting when saturation occurs and generating a saturation signal in response, means for generating a saturation value and means for selecting to provide as an output shifter output data or the saturation value in response to the saturation signal.

In another embodiment of the present invention, a processor unit is disclosed. The processor unit includes means for storing data and instructions therein and means for performing arithmetic shift operations, receiving input data and a shift amount indication, detecting when saturation occurs, generating a saturation value for output when saturation occurs and providing as an output either the input data shifted by the shift amount or, in response to saturation being detected, the saturation value.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device that provides a shift process with saturation for digital signal processor operations. A single instruction is generated for shifting an operand to either maximum or the minimum value depending on the bit of data input when saturation occurs. A saturation detection circuit is provided with an arithmetic shifter and a final decision multiplexor that receives the output from the arithmetic shifter and the saturated value from a saturation circuit. When saturation is detected, the final decision multiplexor selects the saturate minimum or the saturate maximum depending on whether the MSB of the data in equals one or zero, respectively.

Figure 1:
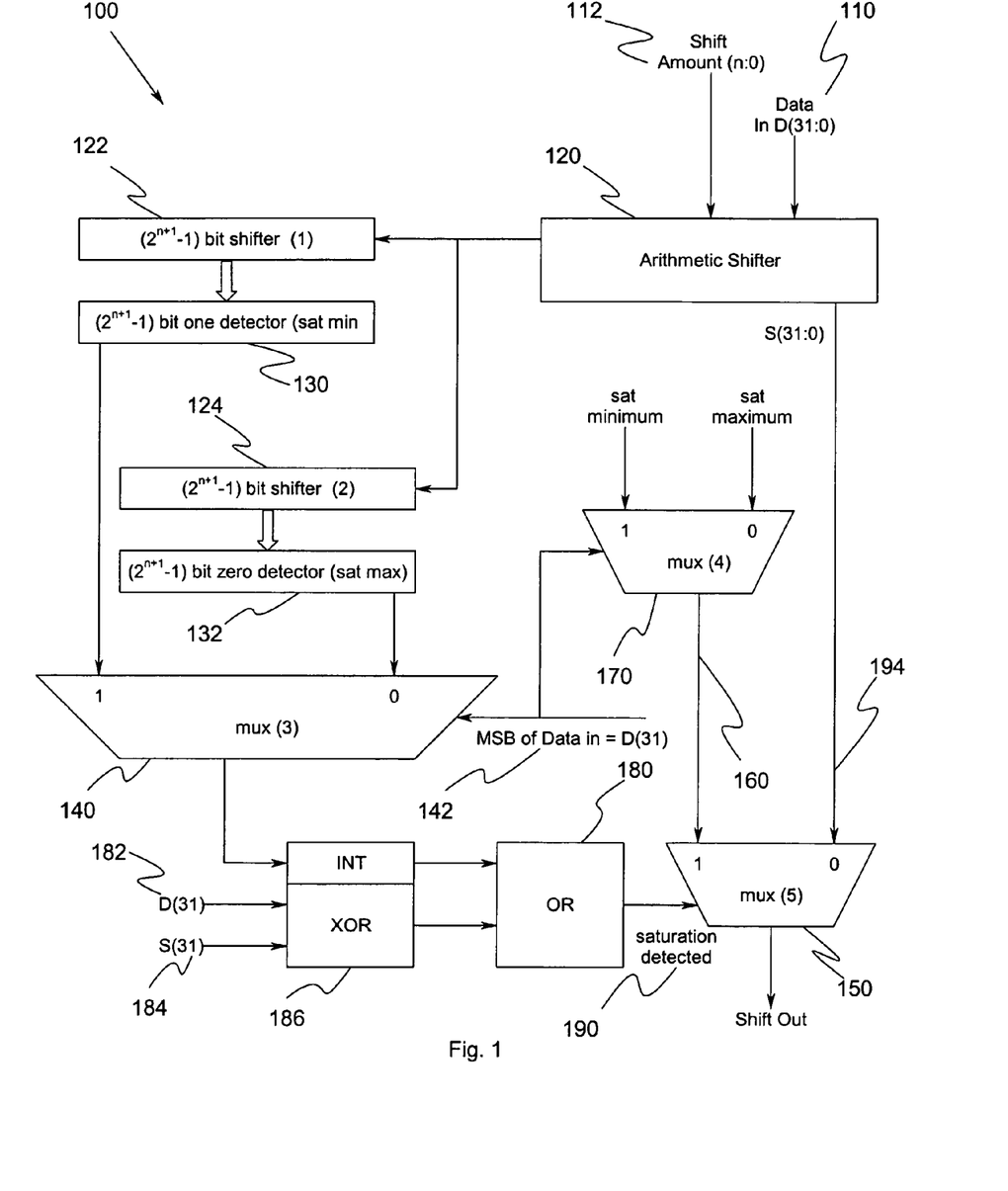
FIG. 1 illustrates an arithmetic shifter and saturation detection circuit according to an embodiment of the present invention.

FIG. 1 illustrates an arithmetic shifter and saturation detection circuit 100 according to an embodiment of the present invention. In FIG. 1, data 110 and shift amount 112 values are provided to an arithmetic shifter 120. At the beginning of a cycle, the arithmetic shifter 120 provides an output to maximum shifter 122 and to minimum 124 shifter. An underflow 130 and overflow 132 detection circuit are coupled to the maximum shifter 122 and to the minimum shifter 124 respectively. When the arithmetic shifter 120 shifts data thru maximum shifter 122 and minimum shifter 124, the bits leaving the arithmetic shifter 120 are filling the maximum shifter 122 and the minimum shifter 124. If the arithmetic shift amount 112 is "n", the arithmetic shifter 120 can perform from 0 to $(2^n-1)$ bit left shifts in a cycle.

A saturation decision multiplexor 140 receives input from the underflow 130 and overflow 132 detection circuits. Herein, the term multiplexor is intended to include any type of device, e.g., switch, logic device, programming code, etc., that connects one signal selected from several inputs to a single output. The most significant bit of data input 142 is used to control the saturation decision multiplexor 140. A final decision multiplexor 150 receives the output 194 from the arithmetic shifter 120, and the saturated value 160 from the output multiplexor 170. The saturation decision multiplexor 140 provides an indicator of saturation to an OR gate 180. The most significant bit of the data 182 and the most significant bit of arithmetic shifter 184 are exclusively ORed (XOR) 186. This result is ORed 180 with the indication of saturation from the saturation decision multiplexor 140. If either is high, the signal "saturation detected" 190 is high.

The arithmetic shifter and saturation detection circuit 100 operates as follows. When the multiple bits are shifted left in a cycle, an arithmetic shifter 120 alone is not able to determine by the arithmetic shifter output if the arithmetic shifter 120 has had a situation of overflow and underflow during the shift operation. Basically, there are two situations when the saturation can be applied. One is that the sign of the arithmetic shifter 120 is different from the sign of the data in 110. The other is when the bits 194 leaving the arithmetic shifter 120 are not the same, i.e., all bits are not either zeros or ones.

The arithmetic shifter and saturation detection circuit 100 detects the saturation cases and modifies the shifter output to either the maximum or the minimum value depending on the sign bit of data input when the saturation has occurred. The arithmetic shifter and saturation detection circuit 100 shifts an operand to the left, i.e., $2^x$*operand. The result would be saturated to $(2^n-1)$ or $-2^n$, which ever is appropriate, for the given sign. Operations would then be the same in the sense that negative values would remain negative and positive values would remain positive.

Assume data 110 provided to the arithmetic shifter 120 was D31, D30, D29, . . . , D0. At the beginning of the cycle, the maximum shifter 122 is initially filled with ones, and the minimum shifter 124 is initially filled with zeroes. If, for example, the shift amount is 3, three bits leave the arithmetic shifter, D(31:29), and fill the maximum 122 and minimum 124 shifter with D(31:29) from the right. The output of the arithmetic shifter 120 is D28, D27, D26, . . . , D0, "000". The content of 15 bit maximum shifter 122 is 1, 1, 1, 1, 1, 1, 1, 1, 1, 1, 1, 1, D31, D30, D29. The ones detection circuit 130 checks if all bits of the shifter 122 are one. The ones detection circuit 130 may be implemented by 15 bit "AND" gate. When the output of ones detection circuit 130 is low, the arithmetic shifter 120 may have been underflowed.

The content of 15 bit minimum shifter 124 is 0, 0, 0, 0, 0, 0, 0, 0, 0, 0, 0, 0, D31, D30, D29. The zeros detection circuit 132 checks if all bits are of the shifter 124 are zero. The zeros detection circuit 132 may be implemented by 15 bit "NOR" gate. When the output of zeros detection circuit 132 is low, the arithmetic shifter 120 may have been overflowed.

The saturation decision multiplexor 140 is selected by the most significant bit (MSB) 142 of data input, D(31). If the MSB 142, D(31), is one, saturation decision multiplexor 140 selects the output of the ones detection circuit 130; otherwise, the saturation decision multiplexor 140 selects the output of the zeros detection circuit 132. When the output signal of the saturation decision multiplexor 140 is low, saturation has occurred. The maximum saturated value (overflow) and the minimum saturated value (underflow) are defined to be "7FFF FFFF" and "8000 0000/1" (could be 8000 0001 for symmetry with positive maximum value) respectively. The output of the output multiplexor 170 is "8000 0000/1" when the MSB 142, D(31), is one; otherwise the output of the output multiplexor 170 is "7FFF FFFF".

The final decision multiplexor 150 selects either the output 194 of the arithmetic shifter 120 or the saturated value 160 from the output multiplexor 170. When the signal "saturation detected" 190 is high, the shift output is modified to the saturated value 160, otherwise the output 194 of the arithmetic shifter 120. Saturation is determined using the output of the saturation decision multiplexor 140 and the most significant bit, S(31) 184, of the arithmetic shifter output, S(31:0) 194, and the most significant bit, D(31) 182, of Data in, (31:0)110. First, when the data in 110 is shifted by n 112, the result is in the arithmetic shifter 120. When the most significant bit, S(31) 184, of the output 194 of the arithmetic shifter 120, and the most significant bit, D(31) 182, of Data in, (31:0) 110, are different, the saturation has occurred. Second, when the output of saturation decision multiplexor 140 is low, the saturation has occurred. In either case, the signal "saturation detected" 190 is set to high. When the signal "saturation detected" 190 is high, saturation has occurred. The final decision multiplexor 150 selects the saturate minimum or the saturate maximum 160 depending on the MSB 142, i.e., D(31) equals one or zero, respectively.

Table 1 below illustrates a normal case and saturated case.

TABLE 1

| Data in (31:0) | MSB Data D(31) | Shift amt(n:0) | Arith shifter (31:0) | MSB Shifter S(31) | Zeros detect | Ones detect | Saturate detected | Saturate value | Final Output (31:0) |
|---|---|---|---|---|---|---|---|---|---|
| Normal Case | | | | | | | | | |
| 0x07FF FFFF | 0 | 3 | 0x3FFF FFF8 | 0 | 1 | 0 | 0 | 0x7FFF FFFF | 0x3FFF FFF8 |
| 0xF7FF FFFF | 1 | 3 | 0xBFFF FFF8 | 1 | 0 | 1 | 0 | 0x8000 0000 | 0xBFFF FFF8 |
| Saturated Case | | | | | | | | | |
| 0x08FF FFFF | 0 | 4 | 0x8FFF FFF0 | 1 | 1 | 0 | 1 | 0x7FFF FFFF | 0x7FFF FFFF |
| 0x08FF FFFF | 0 | 5 | 0x1FFF FFE0 | 0 | 0 | 0 | 1 | 0x7FFF FFFF | 0x7FFF FFFF |
| 0xF7FF FFFF | 1 | 4 | 0x7FFF FFF0 | 0 | 0 | 1 | 1 | 0x8000 0000 | 0x8000 0000 |
| 0xF7FF FFFF | 1 | 5 | 0xFFFF FFE0 | 1 | 0 | 0 | 1 | 0x8000 0000 | 0x8000 0000 |

In the first saturated case, the saturation detection is based on the MSB of the 10 arithmetic shifter output, S31 184, and the MSB of the data, D31 182, being different, wherein the MSB of the data, D31 142, being zero selects the output of the output multiplexor to be 7FFF FFFF. In the second saturated case, the saturation detection is based on the output of the zero detection circuit being zero (i.e., the minimum shift register does not contain all zeroes). In the third saturated case, the saturation detection is based on the MSB of the arithmetic shifter output, S31 184, and the MSB of the data, D31 182, being different, wherein the MSB of the data, D31 142, being one selects the output of the output multiplexor to be 8000 0000. In the fourth saturated case, the saturation detection is based on the output of the ones detection circuit being zero (i.e., the maximum shift register does not contain all ones).

Figure 2:
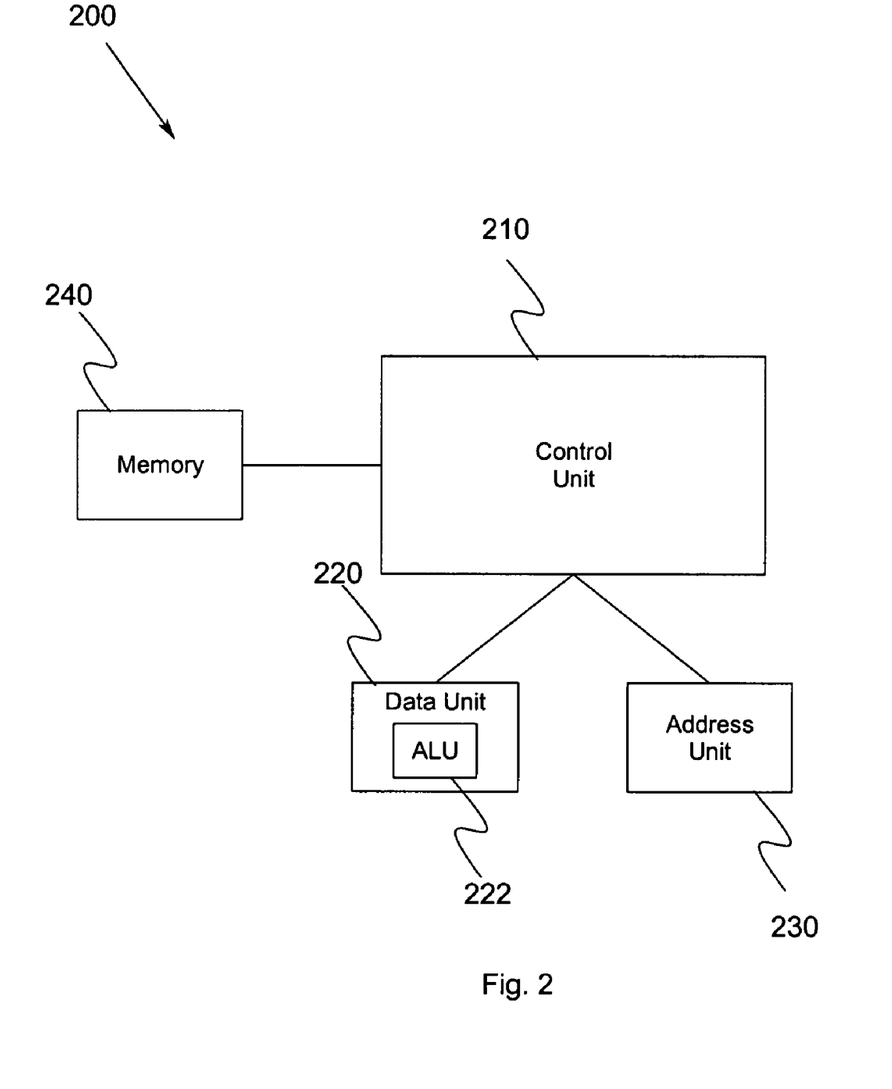
FIG. 2 illustrates a block diagram of a digital signal processing circuit for implementing an arithmetic shifter and saturation detection circuit according to an embodiment of the present invention.

FIG. 2 illustrates a block diagram of a digital signal processing circuit 200 for implementing an arithmetic shifter and saturation detection circuit according to an embodiment of the present invention. FIG. 2 shows a control unit 210, a data unit 220 and an address unit 230. The control unit 210 directs the operation of the digital signal processor based on an instruction set (ISA) optimised for the task of rapid signal processing. The signal processing is divided between the control unit 210 that directs program flow and one or more execution units that perform operations on data. Almost always, a collection of registers/memory 240 is included to hold operands and intermediate results. One of the execution units is the address unit 230. The address unit 230, AU, directs the operand fetch for all variables which are defined and used by the executing instructions or program. Another execution unit is the data unit 220, which includes at least one arithmetic logic unit 222 that accepts as inputs the data to be operated on and a code from the control unit 210 indicating what operation to perform. The arithmetic logic unit 222 provides the result of the computation and may indicate cases such as carry-in or carry-out, overflow, underflow and/or other statuses.

Figure 3:
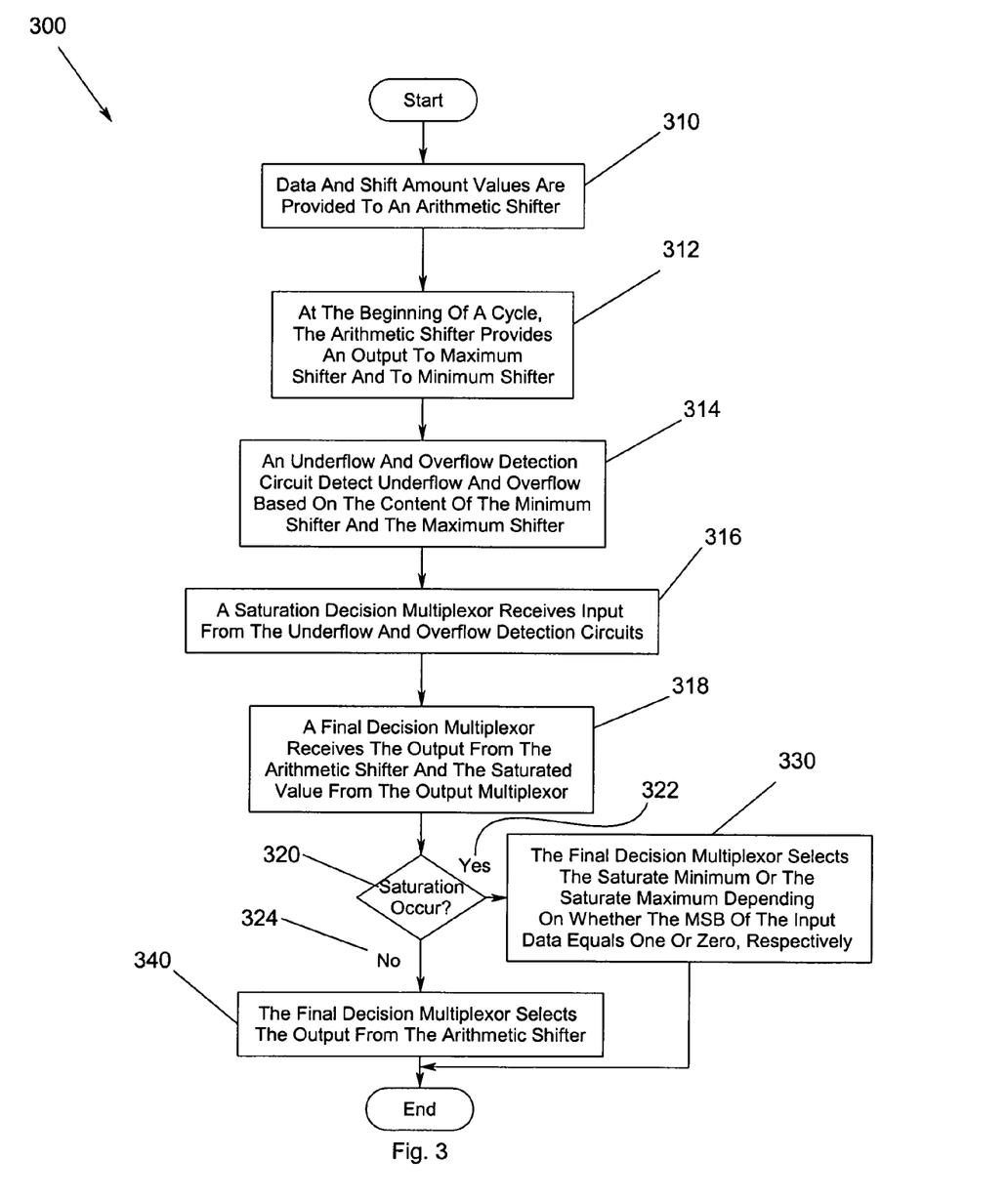
FIG. 3 is a flow chart of the method for providing a shift process with saturation for digital signal processor operations according to an embodiment of the present invention.

FIG. 3 is a flow chart 300 of the method for providing a shift process with saturation for digital signal processor operations according to an embodiment of the present invention. First, data and shift amount values are provided to an arithmetic shifter 310. At the beginning of a cycle, the arithmetic shifter provides an output to maximum shifter and to minimum shifter 312. An underflow and overflow detection circuit detect underflow and overflow based on the content of the minimum shifter and the maximum shifter 314. A saturation decision multiplexor receives input from the underflow and overflow detection circuits 316. A final decision multiplexor receives the output from the arithmetic shifter and the saturated value from the output multiplexor 318. Whether saturation occurs is determined by the final decision multiplexor using the output of the saturation decision multiplexor, the most significant bit of the arithmetic shifter output, and the most significant bit of data in 320. Saturation is detected if the most significant bit of the arithmetic shifter output and the most significant bit of data in are different or if the saturation decision multiplexor so indicates. When saturation is detected 322, the final decision multiplexor selects the saturate minimum or the saturate maximum depending on whether the MSB equals one or zero, respectively 330. Else 324, the final decision multiplexor selects the output from the arithmetic shifter 340.

Figure 4:
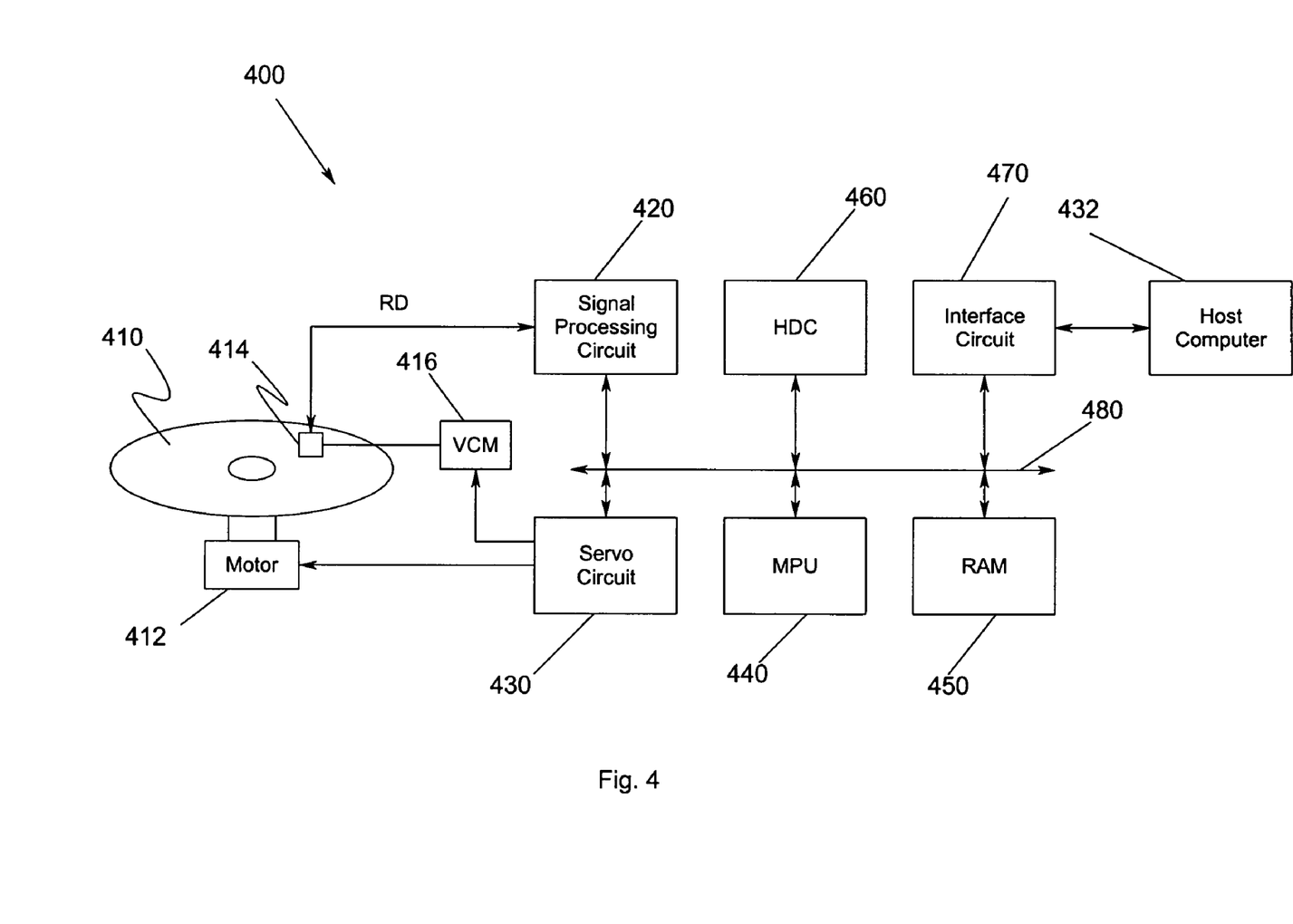
FIG. 4 shows a schematic block diagram showing a hard disk storage system according to one embodiment of the present invention.

A digital signal processor as illustrated above with respect to FIGS. 1-3 may be used in a wide variety of products such as field programmable gate arrays, personal digital assistants (PDAs), cellular phones, digital scanners, digital cameras, personal computers and storage controllers. FIG. 4 shows one example wherein a magnetic disk drive includes a hard drive controller and microprocessor unit. Those skilled in the art will recognize that while the hard drive controller, microprocessor and memory, e.g., SRAM, may be shown separately, such components could easily be combined into one component, e.g., the hard drive controller.

FIG. 4 shows a schematic block diagram showing a hard disk storage system 400 according to one embodiment of the present invention. The hard disk storage system 400 is connected to a host computer 432. The hard disk storage system 400 responds to the write request by the host computer 432 and records the recording data from the host computer 432 on a magnetic disk 410, which serves as a recording medium. The hard disk storage system 400 further responds to the read request from the host computer 432, reads the data recorded on the magnetic disk 410, and sends the data to the host computer 432. The hard disk storage system 400 includes the magnetic disk 410, first and second motors 412, 416, a head device 414, a signal processing circuit 420, a servo circuit 430, a microprocessor (MPU) 440, a memory (RAM) 450, a hard drive controller (HDC) 460, and an interface circuit 470. The circuits 420-470 are connected to one another by a bus 480.

The magnetic disk 410 is rotated by the first motor 412 at a constant rotating speed. The second motor 416 controls the head device 414 so that it moves in the radial direction with respect to the magnetic disk 410. The head device 414 reads the data recorded on the magnetic disk 410 and sends a read signal, RD, to the signal processing circuit 420.

The signal processing circuit 420 samples the read signal, RD, in synchronism with a clock signal and generates a digital read signal. The signal processing circuit 420 carries out a decoding process on the digital read signal and outputs the decoded data signal. The servo circuit 430 controls the first motor 412 and rotates the magnetic disk 410 at a constant speed. The servo circuit 430 further receives the decoded data signal from the signal processing circuit 420 via the bus 480 and controls the second motor 416 based on the servo data included in the digital read signal so that the head device 414 is on track at the target position.

The MPU 440 analyzes the write/read processing command sent from the host computer 432 in accordance with the program data stored in the RAM 450 and sends a control signal to the HDC 460 via the bus 480. The HDC 460 controls the signal processing circuit 420 and the servo circuit 430 in accordance with the control signal from the MPU 440. The HDC 460 further receives a data signal from the signal processing circuit 420 via the bus 480. The HDC 460 processes date, e.g., performs an error correcting code (ECC) process on the data signal. The HDC 460 then sends the processed data to the interface circuit 470 via the bus 480. The interface circuit 470 converts the data from the HDC 460 to a predetermined communication mode and sends the converted data to the host computer 432. The MPU 440 includes an arithmetic logic unit including an arithmetic shifter and saturation detection circuit as illustrated in FIG. 1 for shifting an operand to either maximum or the minimum value depending on the bit of data input when saturation occurs. According to one embodiment of the present invention, the HDC 460 sends a single shift instruction to the MPU 440. The MPU 440 may be configured so that the shift instruction may be run by firmware of the HDC 460. In response to receiving the single shift instruction, the MPU 440 returns a shifted operand or a minimum/maximum saturation value.

It should be appreciated that the MPU 440 could include a standalone processor or an embedded processor, e.g., the MPU 440 could be embedded in the HDC 460. The MPU 440 could be part of a system on a chip (SOC). Further, the MPU 440 could be an ASIC, which would be hardware circuits that perform the function of the processor operating pursuant to memory 450. In such a situation, memory 450 may be used but is not required, as the ASIC is designed to perform any assigned functions. It should also be appreciated that memory 450 could be either volatile or non-volatile memory. The MPU 440 controls the operation of the voice coil motor 416 and spindle motor 412 via the servo unit 430.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An arithmetic shifter with saturation detection, comprising:
    an arithmetic shifter for receiving input data and a shift amount indication and in response to the received input data and the received shift amount indication providing shifted output data shifted N bits according to the shift amount indication in a single cycle;
    a saturation detector, coupled to the arithmetic shifter, for receiving the N most significant bits of the input data from the arithmetic shifter and detecting when overflow or underflow saturation occurs based on the received N most significant bits of the input data and generating a saturation detected signal in response thereto;
    a saturation value generator for generating a saturation value equal to a maximum saturation value when a most significant bit of the input data is one and for generating a saturation value equal to a minimum saturation value when the most significant bit of the input data is zero; and
    an output selector, coupled to the arithmetic shifter, the saturation detector and the saturation value generator, for selecting to provide as an output the shifted output data from the arithmetic shifter or the saturation value from the saturation value generator in response to the saturation detected signal from the saturation detector;
    wherein the saturation detector comprises an underflow detector, an overflow detector and a saturation decision multiplexor for indicating a saturation condition by selecting between an input signal from the underflow detector and a signal from the overflow detector based upon the most significant bit of the input data to the arithmetic shifter, and wherein the saturation detector further comprises a detector for determining when a most significant bit of the arithmetic shifter output and the most significant bit of the input data to the arithmetic shifter are different.

2. The arithmetic shifter with saturation detection of claim 1, wherein the saturation value generator comprises a multiplexor, the multiplexor receiving an overflow input and an underflow input, wherein the multiplexor selects between the overflow input and the underflow input based upon the most significant bit of input data to the arithmetic shifter.

3. The arithmetic shifter with saturation detection of claim 1, wherein the underflow detector comprises a first bit shifter comprising an initial load of all ones and a ones detection device.

4. The arithmetic shifter with saturation detection of claim 3, wherein the ones detection device performs an AND operation on the content of the first bit shifter to detect when the content of the first bit shifter is not all ones.

5. The arithmetic shifter with saturation detection of claim 1, wherein the overflow detector comprises a second bit shifter comprising an initial load of all zeroes and a zeroes detection device.

6. The arithmetic shifter with saturation detection of claim 5, wherein the zeroes detection device performs a NOR operation on the content of the first bit shifter to detect when the content of the second bit shifter is not all zeroes.

7. The arithmetic shifter with saturation detection of claim 1, wherein the saturation detector further comprises a saturation signal generator, the saturation signal generator indicating saturation detection when a saturation condition is provided by the saturation decision multiplexor or when the most significant bit of the arithmetic shifter output and the most significant bit of input data to the arithmetic shifter are different.

8. A processor unit, comprising:
    memory for storing data and instructions therein; and
    a processor configured to implement an arithmetic shifter for receiving input data and a shift amount indication and in response to the received input data and the received shift amount indication providing shifted output data shifted N bits according to the shift amount indication in a single cycle, the processor further being configured to implement a saturation detector for receiving the N most significant bits of the input data from the arithmetic shifter and detecting when overflow or underflow saturation occurs based on the processed N most significant bits of the input data, generating a saturation detected signal in response thereto, to implement a saturation value generator for generating a saturation value equal to a maximum saturation value when a most significant bit of the input data is one and for generating a saturation value equal to a minimum saturation value when the most significant bit of the input data is zero and to implement an output selector for selecting to provide as an output the shifted output data from the arithmetic shifter or the saturation value; from the saturation value generator in response to the saturation detected signal from the saturation detector;
    wherein the processor is further configured to implement the saturation detector to include an underflow detector, an overflow detector and a saturating decision multiplexor for indicating a saturation condition by selecting between an input signal from the underflow detector and a signal from the overflow detector based upon the most significant bit of the input data to the arithmetic shifter, the processor further configuring the saturation detector with a detector for determining when a most significant bit of the arithmetic shifter output and the most significant bit of the input data to the arithmetic shifter are different.

9. The processor unit of claim 8, wherein the processor selects between an overflow value and an underflow value based upon the most significant bit of the input data.

10. The processor unit of claim 8, wherein the processor detects saturation by shifting N data bits in a first memory location having all ones therein and determining, after the N data bits are shifted in the first memory location, when the first memory location comprises all ones and identifying a saturation condition when the first memory location does not comprise all ones.

11. The processor unit of claim 10, wherein the saturation condition comprises an underflow condition when the first memory location does not comprise all ones.

12. The processor unit of claim 8, wherein the processor detects saturation by shifting N data bits in a second memory location having all zeroes therein and determining, after the N data bits are shifted in the second memory location, when the second memory location comprises all zeroes and identifying a saturation condition when the second memory location does not comprise all zeroes.

13. The processor unit of claim 12, wherein the saturation condition comprises an overflow condition when the second memory location does not comprise all zeroes.

14. A storage device, comprising:
a storage controller for processing read and write signals; and
a processor unit, coupled to the storage controller, the processor unit for performing arithmetic shift operations in support of storage operations, wherein the processor unit is configured to implement an arithmetic shifter for receiving input data and a shift amount indication from the storage controller, and in response to the received input data and the received shift amount indication providing shifted output data shifted N bits according to the shift amount indication in a single cycle the processor unit further being configured to implement a saturation detector for receiving the N most significant bits of the input data from the arithmetic shifter and detecting when overflow or underflow saturation occurs based on the processed N most significant bits of the input data, generating a saturation detected signal in response thereto, to implement a saturation value generator for generating a saturation value equal to a maximum saturation value when a most significant bit of the input data is one and for generating a saturation value equal to a minimum saturation value when the most significant bit of the input data is zero and to implement an output selector for selecting to provide as an output the shifted output data from the arithmetic shifter or the saturation value from the saturation value generator in response to the saturation detected signal from the saturation detector;
wherein the processor unit is further configured to implement the saturation detector with an underflow detector, an overflow detector and a saturating decision multiplexor for indicating a saturation condition by selecting between an input signal from the underflow detector and a signal from the overflow detector based upon the most significant bit of the input data to the arithmetic shifter, the processor unit further configuring the saturation detector with a detector for determining when a most significant bit of the arithmetic shifter output and the most significant bit of the input data to the arithmetic shifter are different.

15. The storage device of claim 14, wherein the processor unit selects between an overflow value and an underflow value based upon the most significant bit of the input data.

16. The storage device of claim 14, wherein the processor unit detects saturation by shifting N data bits in a first memory location having all ones therein and determining, after the N data bits are shifted in the first memory location, when the first memory location comprises all ones and identifying a saturation condition when the first memory location does not comprise all ones.

17. The storage device of claim 16, wherein the saturation condition comprises an underflow condition when the first memory location does not comprise all ones.

18. The storage device of claim 14, wherein the processor unit detects saturation by shifting N data bits in a second memory location having all zeroes therein and determining, after the N data bits are shifted in the second memory location, when the second memory location comprises all zeroes and identifying a saturation condition when the second memory location does not comprise all zeroes.

19. The storage device of claim 18, wherein the saturation condition comprises an overflow condition when the second memory location does not comprise all zeroes.

20. A data storage system, comprising:
a translatable recording medium for storing data thereon;
a motor for translating the recording medium;
a transducer disposed proximate the recording medium for reading and writing data on the recording medium;
an actuator, coupled to the transducer, for moving the transducer relative to the recording medium; and
a storage device for controlling operation of the data storage system, the storage control device further comprising:
a storage controller for processing read and write signals; and
a processor unit, coupled to the storage controller, the processor unit for performing arithmetic shift operations in support of storage operations, wherein the processor unit is configured to implement an arithmetic shifter for receiving input data and a shift amount indication from the storage controller, and in response to the received input data and the received shift amount indication providing shifted output data shifted N bits according to the shift amount indication in a single cycle the processor unit further being configured to implement a saturation detector for receiving the N most significant bits of the input data from the arithmetic shifter and detecting when overflow or underflow saturation occurs based on the processed N most significant bits of the input data, generating a saturation detected signal in response thereto, to implement a saturation value generator for generating a saturation value equal to a maximum saturation value when a most significant bit of the input data is one and for generating a saturation value equal to a minimum saturation value when the most significant bit of the input data is zero and to implement an output selector for selecting to provide as an output the shifted output data from the arithmetic shifter or the saturation value from the saturation value generator in response to the saturation detected signal from the saturation detector;
wherein the processor unit is further configured to implement the saturation detector with an underflow detector, an overflow detector and a saturating decision multiplexor for indicating a saturation condition by selecting between an input signal from the underflow detector and a signal from the overflow detector based upon the most significant bit of the input data to the arithmetic shifter, the processor unit further configuring the saturation detector with a detector for determining when a most significant bit of the arithmetic shifter output and the most significant bit of the input data to the arithmetic shifter are different.

21. The data storage system of claim 20, wherein the processor unit selects between an overflow value and an underflow value based upon the most significant bit of the input data.

22. The data storage system of claim 20, wherein the processor unit detects saturation by shifting N data bits in a first memory location having all ones therein and determining, after the N data bits are shifted in the first memory location, when the first memory location comprises all ones and identifying a saturation condition when the first memory location does not comprise all ones.

23. The data storage system of claim 22, wherein the saturation condition comprises an underflow condition when the first memory location does not comprise all ones.

24. The data storage system of claim 20, wherein the processor unit detects saturation by shifting N data bits in a second memory location having all zeroes therein and determining, after the N data bits are shifted in the second memory location, when the second memory location comprises all zeroes and identifying a saturation condition when the second memory location does not comprise all zeroes.

25. The data storage system of claim 24, wherein the saturation condition comprises an overflow condition when the second memory location does not comprise all zeroes.

* * * * *